US012276142B2

(12) United States Patent
Miyata et al.

(10) Patent No.: US 12,276,142 B2
(45) Date of Patent: Apr. 15, 2025

(54) DOOR OPENING/CLOSING DETECTION APPARATUS AND DOOR OPENING/CLOSING APPARATUS

(71) Applicant: U-SHIN LTD., Nagano (JP)

(72) Inventors: Soichi Miyata, Hiroshima (JP); Kazuhiro Fukui, Osaka (JP)

(73) Assignee: U-Shin Ltd., Nagano (JP)

( * ) Notice: Subject to any disclaimer, the term of this patent is extended or adjusted under 35 U.S.C. 154(b) by 281 days.

(21) Appl. No.: 17/754,522

(22) PCT Filed: Oct. 5, 2020

(86) PCT No.: PCT/JP2020/037771

§ 371 (c)(1),
(2) Date: Apr. 5, 2022

(87) PCT Pub. No.: WO2021/075301

PCT Pub. Date: Apr. 22, 2021

(65) Prior Publication Data

US 2022/0396981 A1 Dec. 15, 2022

(30) Foreign Application Priority Data

Oct. 16, 2019 (JP) ................................ 2019-189366

(51) Int. Cl.
*E05B 81/76* (2014.01)
*E05B 85/12* (2014.01)

(52) U.S. Cl.
CPC .............. *E05B 81/76* (2013.01); *E05B 85/12* (2013.01)

(58) Field of Classification Search
CPC ........ E05B 81/76; E05B 85/12; B60J 5/0473; E05F 15/611
See application file for complete search history.

(56) References Cited

U.S. PATENT DOCUMENTS 10,487,547 B2 * 11/2019 Malvy ..................... E05B 81/06
11,679,651 B2 * 6/2023 Couto Maquieira .. B60J 5/0416 292/336.3

(Continued)

FOREIGN PATENT DOCUMENTS

EP 1 463 004 A1 9/2004
JP 2004-285712 A 10/2004

(Continued)

OTHER PUBLICATIONS

International Search Report for corresponding International Application No. PCT/JP2020/037771 mailed Dec. 15, 2020.

(Continued)

*Primary Examiner* — Michael P Ferguson
*Assistant Examiner* — Thomas L Neubauer
(74) *Attorney, Agent, or Firm* — Chrisman Gallo Tochtrop LLC

(57) ABSTRACT

The present application improves operability. In the door opening/closing detection apparatus, the handle is axially supported rotatably on the base with the axis direction in vertical direction. When the handle's gripping portion is rotated from the neutral position to the push operation position rotated toward the outside of the vehicle, the first switch is activated by the handle's switch operation portion. Meanwhile, when the handle's gripping portion is rotated from the neutral position to the pull operation position rotated toward the interior of the vehicle, the handle's cam surface activates the second switch. This allows detection of operations on the handle while keeping the direction of push and pull operations on the gripping portion of the handle in line with the opening/closing direction of the door D. This allows the passenger to intuitively recognize the operation to the handle when opening and closing the door D, leading to improved operability.

9 Claims, 14 Drawing Sheets

(56) References Cited

U.S. PATENT DOCUMENTS

| | | | | |
|---|---|---|---|---|
| 2004/0189442 | A1 | 9/2004 | Amagasa | |
| 2016/0144694 | A1* | 5/2016 | Shchokin | B60J 5/107 475/331 |

FOREIGN PATENT DOCUMENTS

| | | | | | |
|---|---|---|---|---|---|
| JP | 2005-014839 | A | 1/2005 | | |
| JP | 2017-020335 | A | 1/2017 | | |
| JP | 2019-124052 | A | 7/2019 | | |
| WO | WO 2018/015065 | * | 1/2018 | | E05B 81/76 |

OTHER PUBLICATIONS

Written Opinion for corresponding International Application No. PCT/JP2020/037771 dated Dec. 15, 2020.

* cited by examiner (A)

(B)

(A)

(B)

(A)

(B)

(A)

DOOR OPENING/CLOSING DETECTION APPARATUS AND DOOR OPENING/CLOSING APPARATUS

TECHNICAL FIELD

The present invention relates to a door opening/closing detection apparatus and door opening/closing apparatus.

BACKGROUND ART

The vehicle door opening/closing apparatus described in Patent Document 1 below can automatically open and close the doors of a vehicle. In this door opening/closing apparatus for vehicles, the inner door opening/closing switch is provided on the armrest of the door, and when the passenger sets the inner door switch to OPEN or CLOSE, the inner door switch detection unit detects the operation of the inner door switch. When the inner door switch detection unit detects the operation of the inner door switch, the door opening/closing drive unit is driven and the door is opened/closed.

PATENT DOCUMENT

Patent Document 1: Japanese Unexamined Patent Publication No. 2005-014839.

SUMMARY OF INVENTION

Technical Problem

However, there is room for improvement in the above door opening/closing apparatus for vehicles in the following points. In other words, in the above door opening/closing apparatus for vehicles, the inner door switch is configured as a so-called seesaw switch. On the other hand, in conventional manual door inner handles installed in vehicles, the door can be rotated in the open direction by the passenger pulling the door inner handle toward the interior of the vehicle. That is, in the above door opening/closing apparatus for vehicles, the operation of the inner door switch is different from the operation of the conventional manual door inner handle. As a result, the passenger cannot intuitively recognize the operation to the inner door switch, which may reduce the operability.

In consideration of the above fact, it is an object of the present invention to provide a door opening/closing detection apparatus and a door opening/closing apparatus that can improve operability.

Solution to Problem

One or more embodiments of the present invention is a door opening/closing detection apparatus comprising: a base mounted on a vehicle door; a handle with one end portion axially supported in a rotatable way on the base with the vertical direction as an axis direction, with other end portion having a gripping portion exposed to be operatable from the door to an interior side of the vehicle, and when operated, rotates the gripping portion from a neutral position to a pull operation position in which the door is rotated in a closing direction or from the neutral position to a push operation position in which the door is rotated in an opening direction; a detection unit for detecting the push operation position and pull operation position of the handle.

One or more embodiments of the present invention is a door opening/closing detection apparatus, wherein the detection unit is a switch actuated by the handle in the push operation position and pull operation position.

One or more embodiments of the present invention is a door opening/closing detection apparatus, wherein, the detection unit has a pair of switches, and the handle comprises: a handle main body with one end portion axially supported in a rotatable way by the base, and has the gripping portion at the other end; and a sub-handle that is axially supported in a rotatable way on the base coaxially with the handle main body, rotates in conjunction with the handle main body when the handle main body rotates from the neutral position to one side in the direction of rotation, and is held in the neutral position when the handle main body rotates from the neutral position to the other side in the direction of rotation, being uninterlocked from the rotation of the handle main body, wherein, the handle main body has a main body side operation portion that activates one of the pair of switches when rotating from the neutral position to the other side in the direction of rotation; and the sub-handle has a sub-side operation portion that activates the other of the pair of switches when the handle main body is rotated from the neutral position to one side in the direction of rotation.

One or more embodiments of the present invention is a door opening/closing detection apparatus, comprising: a first urging member that urges the handle main body against the sub-handle in one side in the direction of rotation; and a second urging member that urges the sub-handle against the base toward the other side in the direction of rotation, wherein, in the neutral position, the sub-handle contacts the base to restrict rotation of the sub-handle to the other side in the direction of rotation, and the handle min body contacts the sub-handle to restrict rotation of the handle main body to one side in the direction of rotation.

One or more embodiments of the present invention is a door opening/closing detection apparatus, wherein, the handle is provided with a magnet, and the detection unit has a pair of magnetic sensors; and the pull operation position of the handle is detected by detecting the proximity of the magnet by one of the magnetic sensors when the handle is rotated, and the push operation position of the handle is detected by detecting the proximity of the magnet by the other magnetic sensor when the handle is rotated.

One or more embodiments of the present invention is a door opening/closing apparatus, comprising: a door opening/closing detection apparatus in the above embodiments; a door opening/closing drive unit that opens and closes a vehicle door; a door opening/closing position detection unit that detects the opening/closing position of the door; a control unit to control the door opening/closing drive unit, wherein, when a handle is rotated to the pull operation position while the door is positioned in the fully closed position, the control unit drives the door opening/closing drive unit to rotate the door in the open direction.

One or more embodiments of the present invention is a door opening/closing apparatus, wherein the control unit inhibits the drive of the door opening/closing drive unit when the handle is rotated to the push operation position while the door is positioned in the fully closed position.

One or more embodiments of the present invention is a door opening/closing apparatus, wherein the control unit drives the door opening/closing drive unit to rotate the door in the closing direction when the handle is rotated to the pull operation position while the door is positioned in the fully open or open position.

One or more embodiments of the present invention is a door opening/closing apparatus, wherein the control unit drives the door opening/closing drive unit to rotate the door in the open direction when the handle is rotated to the push operation position while the door is positioned in the open position.

Advantageous Effects of Invention

According to one or more embodiments of the invention, operability can be improved.

DESCRIPTION OF EMBODIMENTS

Figure 1:
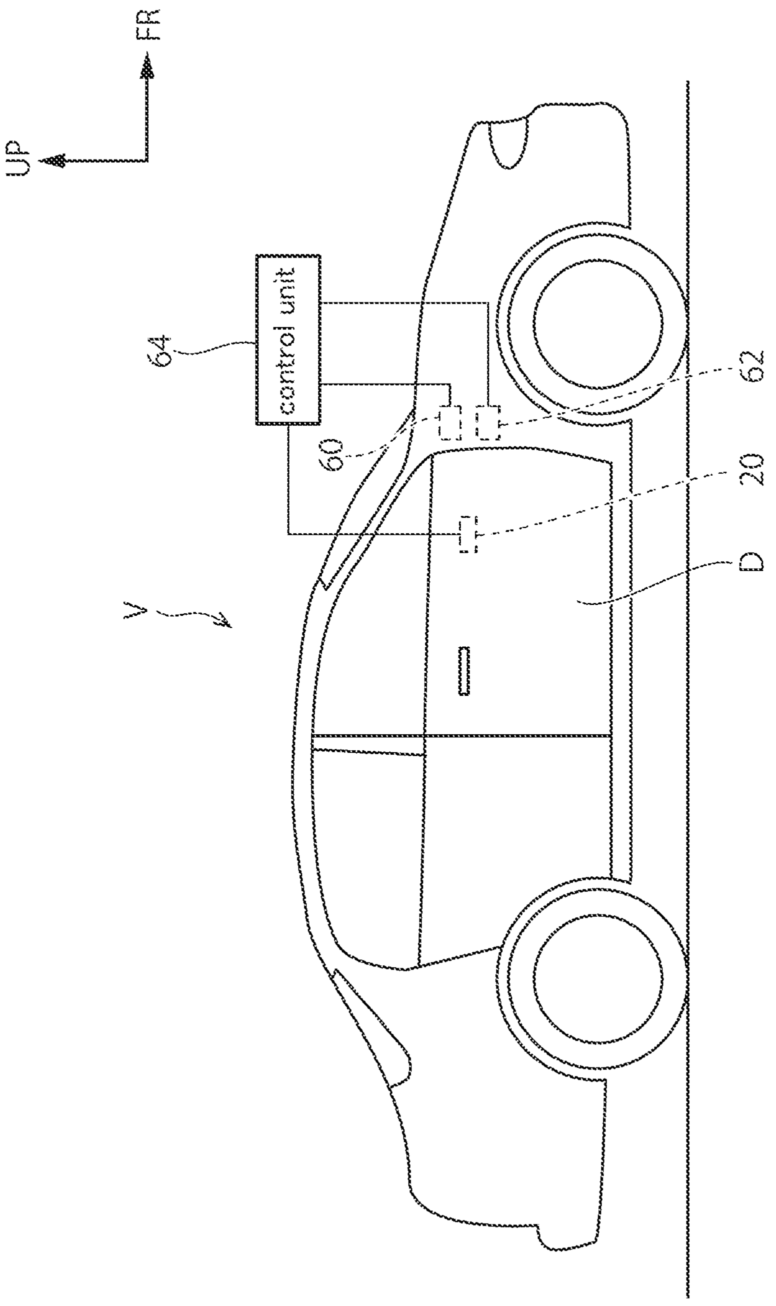
FIG. 1 is a side view from the right side showing a vehicle equipped with the door opening/closing apparatus according to this embodiment.

Hereinafter, the door opening/closing apparatus 10 according to the present embodiment will be described with reference to the drawings. As shown in FIG. 1, the door opening/closing apparatus 10 is mounted on a vehicle V (automobile). In the drawings, the arrow UP, the arrow FR, and the arrow RH, which are appropriately shown, indicate the vehicle upper side, the vehicle front side, and the vehicle right side (one side in the vehicle width direction) of the vehicle V, respectively. Hereinafter, when the description is made using the vertical, front/rear, and left/right directions, the vehicle up/down direction, the vehicle front/rear direction, and the vehicle left/right direction shall be indicated unless otherwise specified.

The door opening/closing apparatus 10 is configured as an apparatus that automatically opens/closes the door D (side door) of the vehicle V. The door opening/closing apparatus 10 comprises a door opening/closing detection apparatus 20, a door opening/closing drive unit 60, a door opening/closing position detection apparatus 62 as a "door opening/closing position detection unit", and a control unit 64, wherein the door opening/closing detection apparatus 20 is mounted on the door D.

For convenience, the following explanation assumes that the door opening/closing detection apparatus 20 is mounted on the right front side door D of the vehicle V. The front end of the door D is connected to the front pillar of the vehicle V by means of a door hinge (not shown) that can be opened and closed with the vertical direction as the axis direction. Specifically, the door D is configured to be able to open and close between the fully closed position, in which the door opening of the vehicle V is closed, and the fully open position, in which the door opening is opened by being rotated maximally to the right (outside the vehicle width direction) from the fully closed position. Each configuration of the door opening/closing apparatus 10 is described below.

(Door Opening/Closing Detection Apparatus 20)

Figure 2:
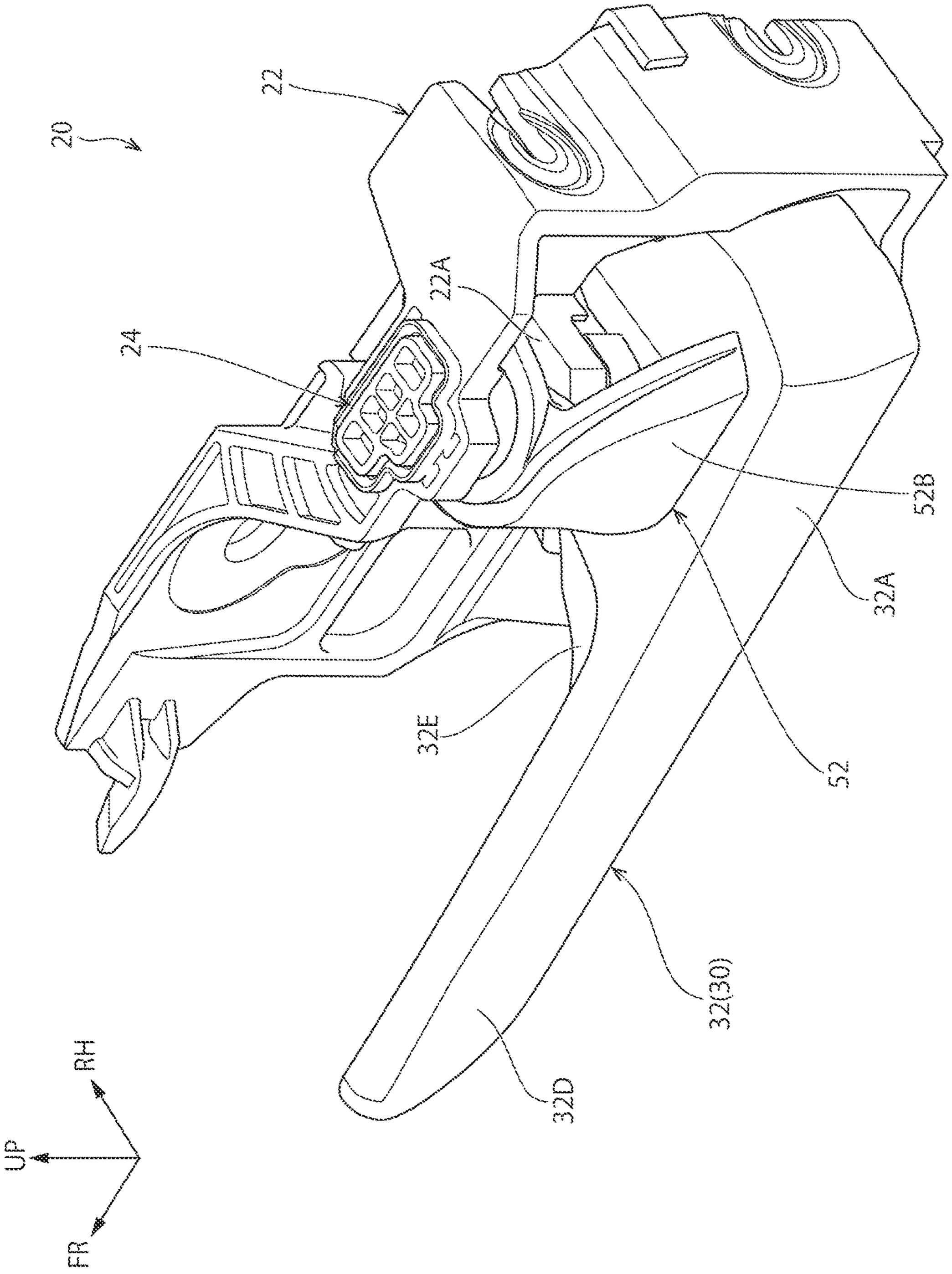
FIG. 2 is a perspective view which shows the door opening/closing detection apparatus according to this embodiment.
Figure 3:
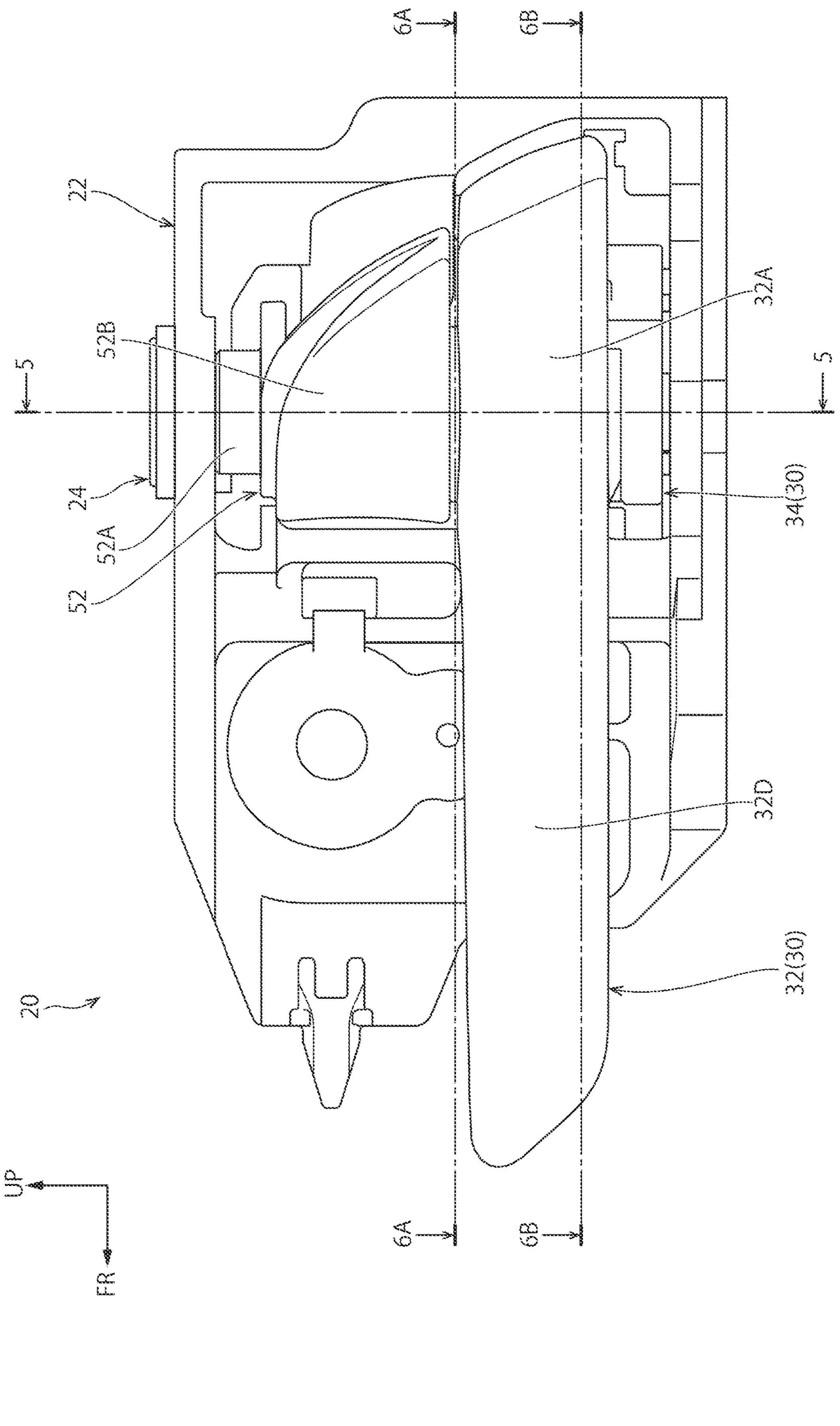
FIG. 3 is aside view seen from the left side showing the door opening/closing detection apparatus shown in FIG. 2.
Figure 4:
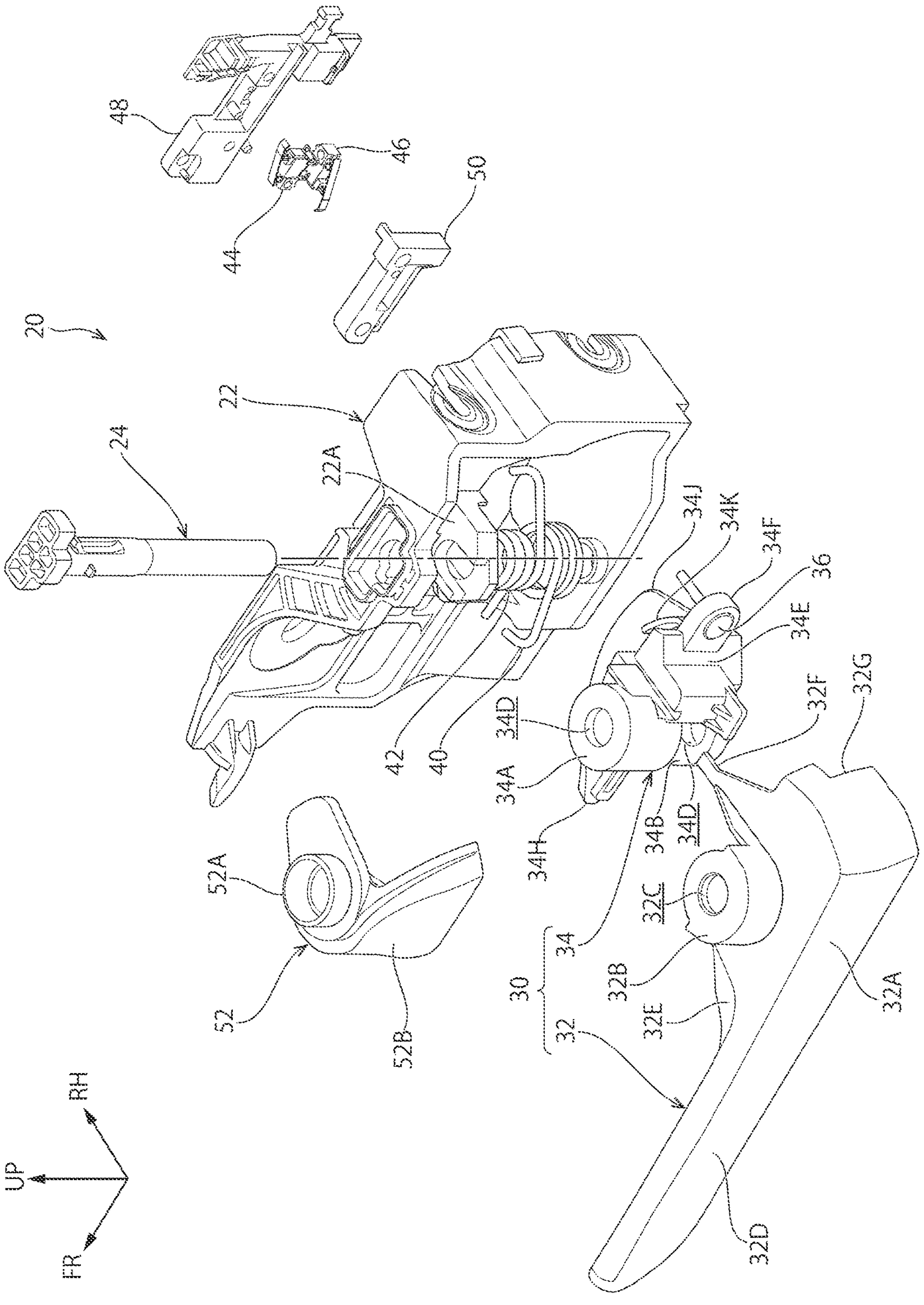
FIG. 4 is an exploded perspective view which shows the door opening/closing detection apparatus shown in FIG. 2 in the disassembled state.

As shown in FIGS. 2 to 4, the door opening/closing detection apparatus 20 comprises a base 22, a handle 30, a first urging spring 40 as a "first urging member", a second urging spring 42 as a "second urging member", a first switch 44 as a "detection unit" and a "switch", a second switch 46 as a "detection unit" and a "switch", and a knob cover 52. In the following description of the door opening/closing detection apparatus 20, the door D is assumed to be placed in the fully closed position.

<Base 22>

As shown in FIGS. 2 to 6, the base 22 is formed in the roughly rectangular box shape open to the left side (vehicle interior side) and front side, and is fixed to the inner panel of the door D (not shown). A support shaft 24 is bridged between the upper and lower walls at the rear portion of the base 22, and the support shaft 24 is formed in a roughly columnar shape with the vertical direction as the axial direction. Further, a support piece 22A projecting to the left side is integrally formed on the bottom wall (right wall) of the base 22, and the axial intermediate portion of the support shaft 24 is also supported by the support piece 22A. Further, an opening 22B for arranging the first switch 44 and the second switch 46, which will be described later, is formed through the bottom wall at the rear portion of the base 22.

Further, on the bottom wall of the base 22, a roughly cylindrical base stopper portion 22C (cf. FIG. 6B) protruding to the left side is formed at the front side edge portion of the opening 22B. A recess opened to the left side is formed on the left end surface of the base stopper portion 22C, and a mounting hole 22C1 is formed through the bottom surface of the recess. A first cushion 26 (cf. FIG. 6B) is attached to the recess of the base stopper portion 22C. The first cushion 26 is made of an elastic material such as rubber, and is formed in a roughly shaft shape with the left-right direction as the axial direction. The first cushion 26 is inserted into the mounting hole 22C1 from the left side, and the left end portion of the first cushion 26 is fitted into the recess of the base stopper portion 22C to fix the first cushion 26 to the base stopper portion 22C. In the fixed state of the first cushion 26, the left end surface of the first cushion 26 protrudes slightly to the left than the base stopper portion 22C.

<Handle 30>

The handle 30 is composed of a handle main body 32 and a sub-handle 34.

[Handle Main Body 32]

As shown in FIGS. 2 through 7A, the handle main body 32 is formed in the shape of a roughly rectangular block extending in the front-rear direction and is arranged with the left side slightly inclined toward the front side, in a plan view from the top side. The rear end side portion (one end side portion) of the handle main body 32 is configured as the handle mounting portion 32A, which is formed in a concave shape open to the right side. The upper wall of the handle mounting portion 32A has a roughly bottomed cylindrical main body side shaft portion 32B that rises upward and is open to the right and bottom sides. A pair of upper and lower main body side support holes 32C are formed through the top wall of the main body side shaft 32B and the bottom wall of the handle mounting portion 32A, and the pair of main body side support holes 32C are coaxially arranged. The handle mounting portion 32A is placed between the lower wall of the base 22 and the support piece 22A, and the lower part of the support shaft 24 is inserted into the main body side support hole 32C. As a result, the handle main body 32 is axially supported by the base 22 via the support shaft 24 in a rotatable manner with the vertical direction as the axial direction.

The front end portion (other end portion) of the handle main body 32 is configured as the gripping portion 32D. The gripping portion 32D has a gouged portion 32E that is open to the upper and right side (outside in the vehicle width direction). The front end portion of the gripping portion 32D is notched so that it is open to the front and right side in plan view.

The handle main body 32 is exposed from the door trim (interior component) of the door D to be rotatably operated toward the interior side (left side) of the vehicle. As a result, the handle main body 32 is configured to rotate around the axis of the support shaft 24 when a passenger grips the gripping portion 32D of the handle main body 32 and rotationally operates the handle main body 32. Specifically, the gripping portion 32D of the handle main body 32 is configured to be rotatable from the neutral position shown in FIGS. 6A and 6B to the pull operation position (cf. position shown in FIG. 9B) rotated to one side in the direction of rotation (the side of the car interior and the side toward which the door D closes (arrow B direction side in FIG. 6B)), or from the neutral position to a push operation position (cf. position shown in FIG. 9A) rotated to the other side in the direction of rotation (the side of the car exterior and the side toward which the door D opens (arrow A direction side in FIG. 6A)).

The upper wall of the handle mounting portion 32A has a switch operation portion 32F as a "main body-side operation portion" that extends to the right side. The tip of the switch operation portion 32F is configured as the part that activates the first switch 44 described below. At the rear end portion of the handle main body 32, a main body side contacting portion 32G (cf. FIGS. 6B and 7A) is formed at the lower right. The main body side contacting portion 32G is configured as a surface along a direction orthogonal to the left-right direction.

[Sub-Handle 34]

As shown in FIGS. 2 through 6 and 7B, the sub-handle 34 has a roughly columnar sub-side shaft portion 34A with the vertical direction as the axis direction. The lower part of the sub-side shaft portion 34A has a first housing portion 34B open to the left side, and the upper part of the sub-side shaft portion 34A has a second housing portion 34C open to the right side (cf. FIG. 5). A sub-side support hole 34D are each formed through the upper wall, lower wall, and middle wall of the sub-side shaft portion 34A (the wall between the first housing portion 34B and the second housing portion 34C). The portion of the sub-side shaft portion 34A excluding the lower wall is inserted into the handle mounting portion 32A of the handle main body 32, and the support shaft 24 is inserted through the sub-side support hole 34D (cf. FIG. 5). This allows the sub-handle 34 to be axially supported in a rotatable way on the base 22 via the support shaft 24. In other words, the sub-handle 34 is axially supported in a rotatable way on the base 22 coaxially with the handle main body 32. When the sub-handle 34 is axially supported on the base 22, the lower wall of the sub-side shaft portion 34A is positioned between the lower wall of the base 22 and the handle main body 32.

Further, the sub-handle 34 has an mounted portion 34E extending rearward from the sub-side shaft portion 34A, and the mounted portion 34E is inserted into the handle mounting portion 32A of the handle main body 32. A sub-stopper portion 34F (cf. FIGS. 4, 6B, and 7B) protruding rearward is formed at the rear end portion of the mounted portion 34E, and the sub-stopper portion 34F is formed in a plate-shape with the left-right direction as the plate thickness direction. The sub-stopper portion 34F is positioned adjacent to the right side of the main body side contacting portion 32G in the handle main body 32, and the main body side contacting portion 32G contacts the sub-stopper portion 34F by the urging force of the first urging spring 40 described below (cf. FIG. 6B).

A recess open to the left is formed in the left end surface of the sub-stopper portion 34F, and a mounting hole 34G is formed through the bottom surface of the recess. A second cushion 36 (cf. FIG. 4 and FIG. 6B) is attached to the recess of the sub-stopper portion 34F. The second cushion 36 is composed of elastic material such as rubber and is formed in a roughly shaft shape with the left and right directions as the axial directions. The left end portion of the second cushion 36 is fitted into the mounting hole 34G, and the second cushion 36 is fixed to the sub-stopper portion 34F in a state of extending to the right side from the sub-stopper portion 34F. In the fixed state of the second cushion 36, the left end surface of the second cushion 36 protrudes slightly more to the left than the sub-stopper portion 34F.

The sub-handle 34 has a sub-side contacting portion 34H extending forward from the sub-side shaft portion 34A. The sub-side contacting portion 34H is formed as a roughly triangular plate shape with the left-right direction as the plate thickness direction. The sub-side contacting portion 34H is located between the rear end of the gripping portion 32D in the handle main body 32 and the base stopper portion 22C in the base 22. Specifically, the sub-side contacting portion 34H is in contact with the base stopper portion 22C and is positioned with a predetermined gap on the right side with respect to the rear end portion of the gripping portion 32D (cf. FIGS. 6A and 6B). As a result, in plan view, the rotation of the sub-handle 34 in the other direction of rotation (arrow A direction side in FIG. 6A) is restricted by the base 22.

The sub-handle 34 also has a cam piece 34J extending from the sub-side shaft 34A to the right. The cam piece 34J is formed in a roughly plate shape with the vertical direction as the plate thickness direction. On the upper surface of the cam piece 34J, a cam portion 34K as a "sub-side operation portion" protruding upward is integrally formed. The cam portion 34K is formed in a roughly fan shape in plan view, centered on the central axis of the sub-side support hole 34D, and the tip of the cam portion 34K is configured as the cam surface 34L. The tip portion of the cam portion 34K has a notch 34M open to the right and above side at the longitudinal midsection of the cam surface 34L.

<The First Urging Spring 40>

Figure 5:
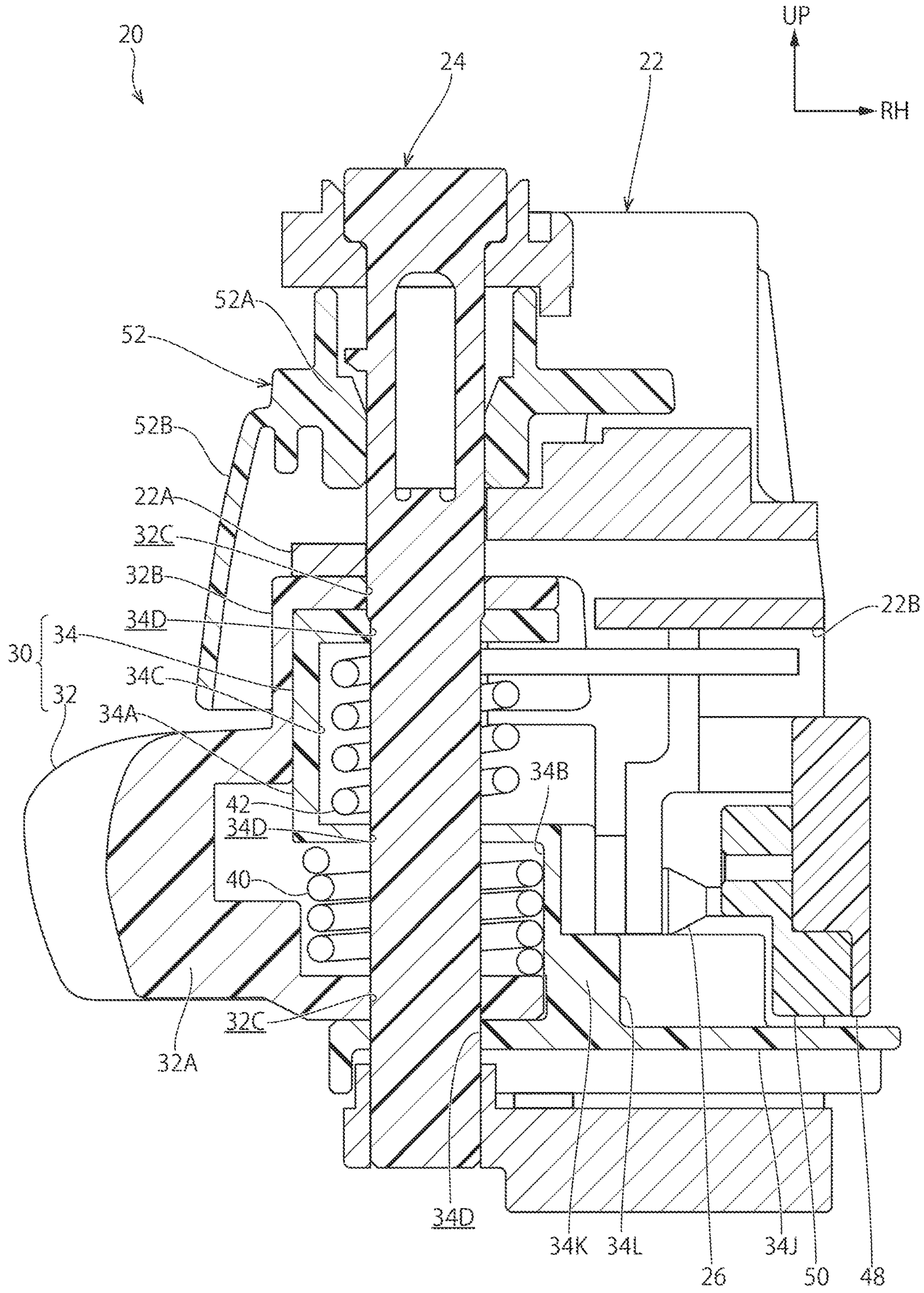
FIG. 5 is cross-sectional view (5-5 line cross-sectional view of FIG. 3) seen from the rear side which shows the rear portion of the door opening/closing detection apparatus shown in FIG. 3.

As shown in FIGS. 4 and 5, the first urging spring 40 is composed of a torsion spring. The first urging spring 40 is housed in the first housing portion 34B of the sub-handle 34 and is also extrapolated to the support shaft 24. One end of the first urging spring 40 is engaged to the sub-side contacting portion 34H of the sub-handle 34, and the other end of the first urging spring 40 is engaged to the handle mounting portion 32A of the handle main body 32, and the first urging spring 40 urges the handle main body 32 toward the pull operation position (one side in the direction of rotation) against the sub-handle 34. As a result, the main body side contacting portion 32G of the handle main body 32 contacts the sub-stopper portion 34F of the sub-handle 34, and the second cushion 36 is compressed and deformed by the main body side contacting portion 32G.

(The Second Urging Spring 42)

The second urging spring 42 is composed of a torsion spring similar to the first urging spring 40. The second urging spring 42 is housed in the second housing portion 34C of the sub-handle 34 and is also extrapolated to the support shaft 24. One end of the second urging spring 42 is engaged to the base 22 and the other end of the second urging spring 42 is engaged to the mounted portion 34E of the sub-handle 34, and the second urging spring 42 urges the sub-handle 34 toward the push operation position (other side of the rotation direction). As a result, the sub-side contacting portion 34H of the sub-handle 34 contacts the base stopper portion 22C of the base 22 and the first cushion 26 is compressed and deformed. The state in which the sub-side contacting portion 34H is in contact with the base stopper portion 22C is the neutral position of the sub-handle 34, and the sub-handle 34 is held in the neutral position by the urging force of the second urging spring 42. In the neutral position of the sub-handle 34, the handle main body 32 is held in the neutral position by the force of the first urging spring 40.

When the handle main body 32 is rotationally operated from the neutral position to the pull operation position, the main body side contacting portion 32G of the handle main body 32 presses the sub-stopper portion 34F of the sub-handle 34 to the right side, causing the handle main body 32 and sub-handle 34 to rotate toward the pull operation position against the urging force of the second urging spring 42. That is, when the handle main body 32 is rotationally operated from the neutral position to the pull operation position, the sub-handle 34 is rotated in conjunction with the rotation of the handle main body 32, and the sub-side contact portion 34H of the sub-handle 34 is separated from the base stopper portion 22C of the base 22 to the left side. When the operation of the handle main body 32 is released in the pull operation position, the handle main body 32 and sub-handle 34 return to the neutral position by the urging force of the second urging spring 42.

On the other hand, when the handle main body 32 is rotationally operated from the neutral position to the push-operation position, only the handle main body 32 is rotated to the push operation position because the base 22 restricts the rotation of the sub-handle 34 to the push-operation position. In other words, the sub-handle 34 is kept in the neutral position and the main body side contact portion 32G of the handle main body 32 is separated from the sub-stopper portion 34F of the sub-handle 34 to the left side. When the operation of the handle main body 32 is released in the push operation position, the handle main body 32 returns to the neutral position by the urging force of the first urging spring 40.

(The First Switch 44 and the Second Switch 46)

Figure 8:
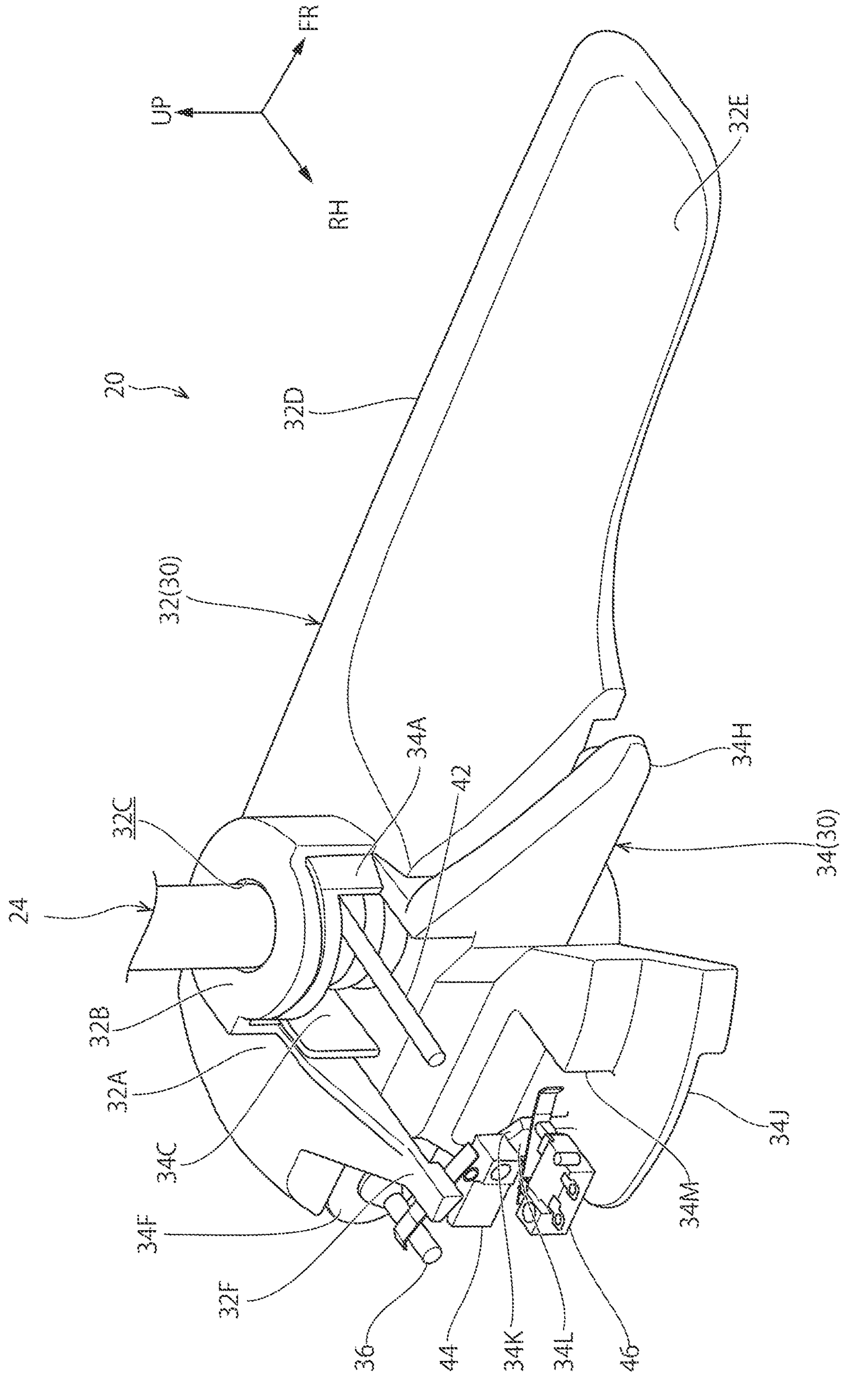
FIG. 8 is a perspective view which shows the positional relationship between the first switch and the second switch shown in FIG. 4 and a handle main body and a sub-handle.

As shown in FIGS. 4 and 8, the first switch 44 and the second switch 46 are configured as lever-type switches and are electrically connected to the control unit 64 described below. The first switch 44 is located proximate to the lower side of the tip end of the switch operation portion 32F in the handle body 32. In the first switch 44, the first switch 44 is arranged so that the axis direction of the lever's axis of rotation is in the left-right direction. When the handle main body 32 is rotated to the push operation position, the switch operation portion 32F is rotated to the rear side to press the lever of the first switch 44. This causes the first switch 44 to actuate and output a detection signal to the control unit 64. In other words, the first switch 44 is configured as a switch that detects the rotational operation of the handle 30 to the push operation position.

The second switch 46 is located proximate to the right side of the cam portion 34K in the sub-handle 34. In the second switch 46, the second switch 46 is positioned so that the axis direction of the lever's axis of rotation is in the vertical direction. Furthermore, the lever of the second switch 46 is located in the notch 34M of the cam portion 34K. When the handle main body 32 and sub-handle 34 are rotated to the pull operation position, the cam surface 34L (cam portion 34K) of sub-handle 34 is rotated to the forward side to press the lever of the second switch 46. This causes the second switch 46 to actuate and output a detection signal to the control unit 64. In other words, the second switch 46 is configured as a switch that detects the rotational operation of the handle 30 to the pull operation position.

The first switch 44 and the second switch 46 are installed on a switch base 48 (cf. FIG. 4) fixed to the base 22 and are held in the switch base 48 by a switch holder 50 (cf. FIG. 4). The switch base 48 is formed in the shape of a roughly T-shaped plate with the left-right direction as the plate thickness direction. The switch base 48 is located on the right side of the opening 22B of the base 22 and is secured to the base 22 by fixing members such as screw. The switch holder 50 is formed in a roughly rectangular frame plate shape with the left and right directions as the plate thickness direction, and is located adjacent to the left side of the switch base 48. The switch holder 50 is fixed to the switch base 48 by a fixing member such as a screw.

<Knob Cover 52>

As shown in FIGS. 2 to 5, the knob cover 52 is arranged on the upper side of the handle mounting portion 32A of the handle main body 32, and is configured as a member that covers the upper part of the support shaft 24. The knob cover 52 has a cover shaft portion 52A, and the cover shaft portion 52A is formed in a roughly cylindrical shape with the vertical direction as the axial direction. The cover shaft portion 52A is arranged between the upper wall of the base 22 and the support piece 22A, and is axially supported by the support shaft 24. Further, the knob cover 52 has a cover portion 52B. The cover portion 52B is formed so as to extend downward from the cover shaft portion 52A and cover the handle main body 32 from the left side of the main body side shaft portion 32B.

(Door Opening/Closing Drive Unit 60)

As shown in FIG. 1, the door opening/closing drive unit 60 is configured as a drive unit for opening/closing the door D under the control of the control unit 64 described later. The door opening/closing drive unit 60, for example, has a motor as a drive source and transmits the drive of the motor to a door hinge on the door D to rotate said door hinge to open and close the door D. To transmit the drive of the motor to the door hinge, for example, a link or gear mechanism can be used.

(Door Opening/Closing Position Detection Apparatus 62)

The door opening/closing position detection apparatus 62 is configured as a device to detect the opening/closing position of the door D. The opening/closing position detecting apparatus 62 is composed of an encoder or the like as an example, and is positioned in proximity to the door hinge to detect the opening of the door hinge. The door opening/closing position detection apparatus 62 is electrically connected to the control unit 64 described below, and is configured to output a detection signal corresponding to the opening/closing position of the door D to the control unit 64. The door opening/closing position detection apparatus 62 is not limited to the above configuration. For example, a sensor that detects the rotational position of the output shaft of the motor in the door opening/closing drive unit 60 may be configured as a door opening/closing position detection apparatus 62 to detect the opening/closing position of the door D.

(Control Unit 64)

The control unit 64 is electrically connected to the first switch 44 and the second switch 46 of the door opening/closing detection apparatus 20, the door opening/closing drive unit 60, and the door opening/closing position detection apparatus 62. The control unit 64 determines the rotational operation state of the handle 30 based on the detection signals from the first and second switches 44 and 46, and the opening/closing position (state) of the door D based on the detection signal from the door opening/closing position detection apparatus 62. The control unit 64 is configured to drive and control the door opening/closing drive unit 60 based on the determined rotational operation state of the handle 30 and the opening/closing position of the door D.

(Operation and Effects)

Next, the operation and effects of the embodiment will be explained while describing the operation of the door opening/closing detection apparatus 20 and the door opening/closing apparatus 10.

(Operation of the Door Opening/Closing Detection Apparatus 20)

Figure 6A:
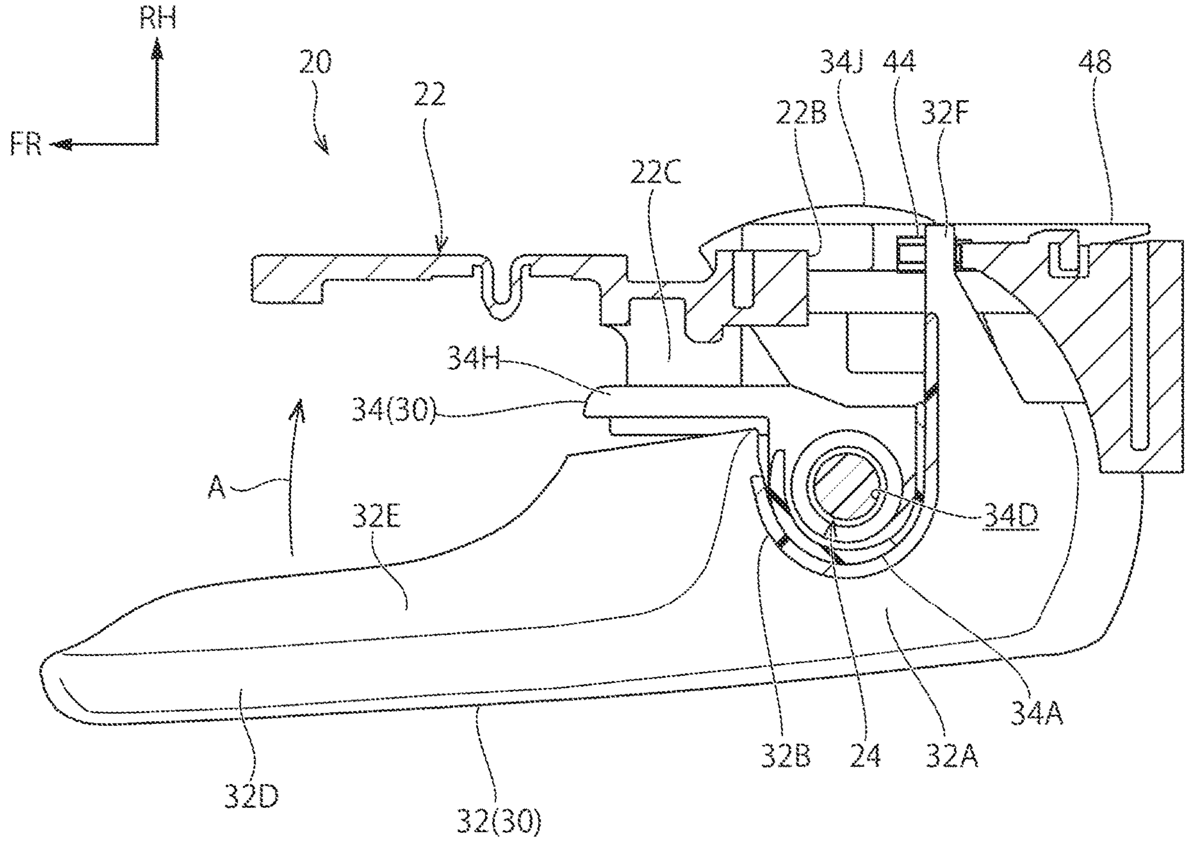
FIG. 6A is cross-sectional view (6A-6A line cross-sectional view of FIG. 3) seen from the upper side which shows the vertical intermediate portion of the door opening/closing detection apparatus shown in FIG. 3.
Figure 6B:
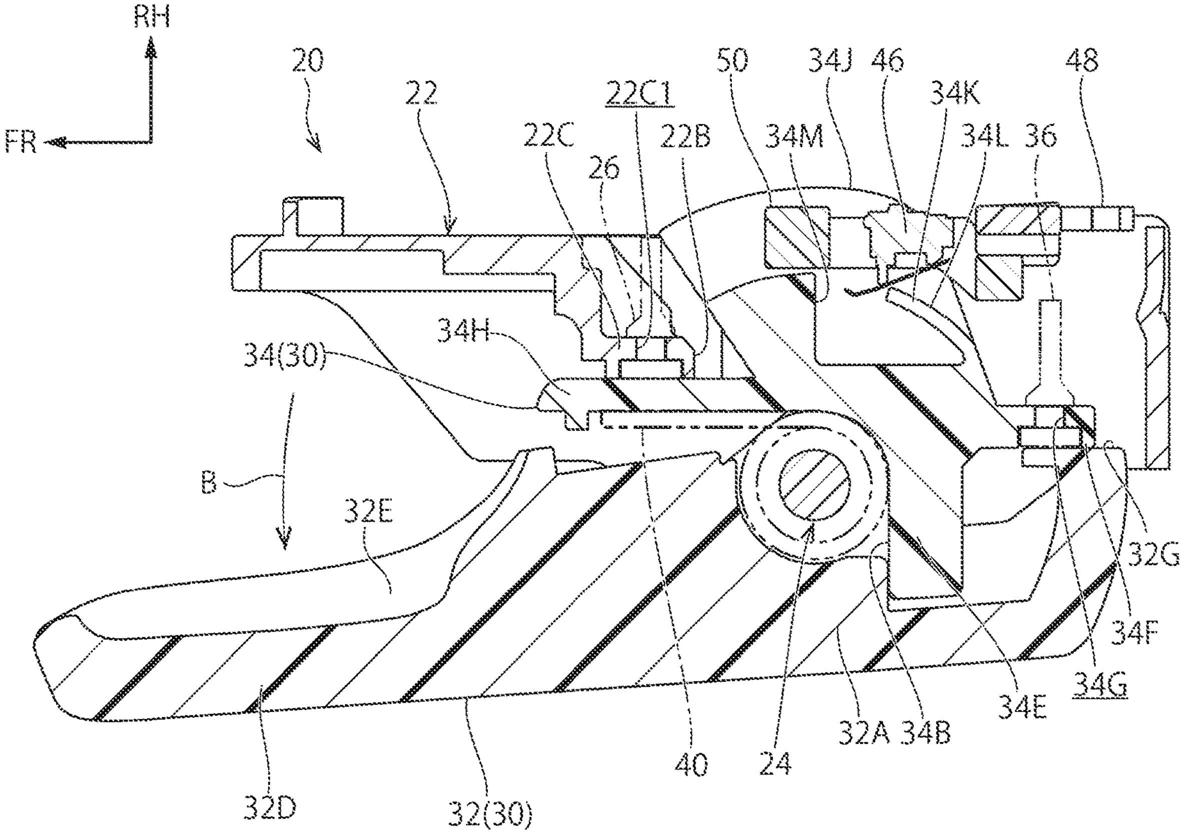
FIG. 6B is cross-sectional view (6B-6B line cross-sectional view of FIG. 3) seen from the upper side which shows the lower portion of the door opening/closing detection apparatus shown in FIG. 3.
Figure 7A:
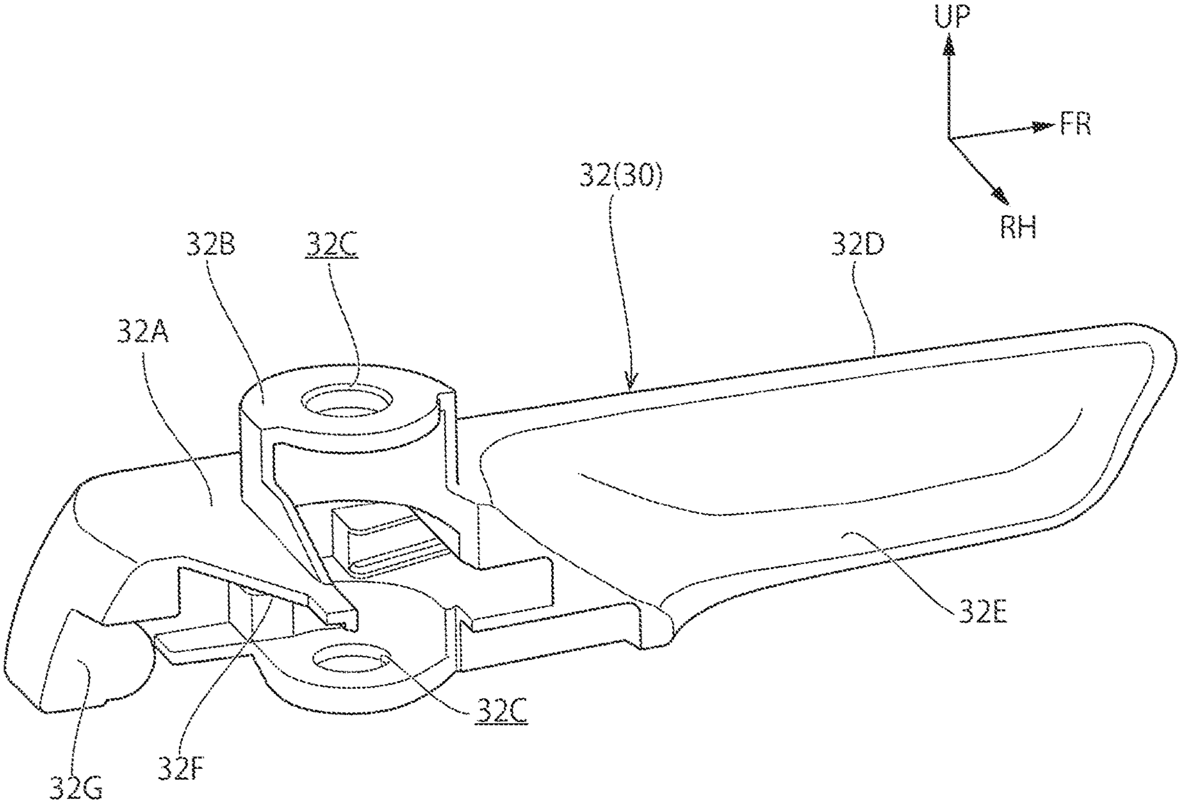
FIG. 7A is a perspective view of the handle main body shown in FIG. 4 as viewed from the right side.
Figure 7B:
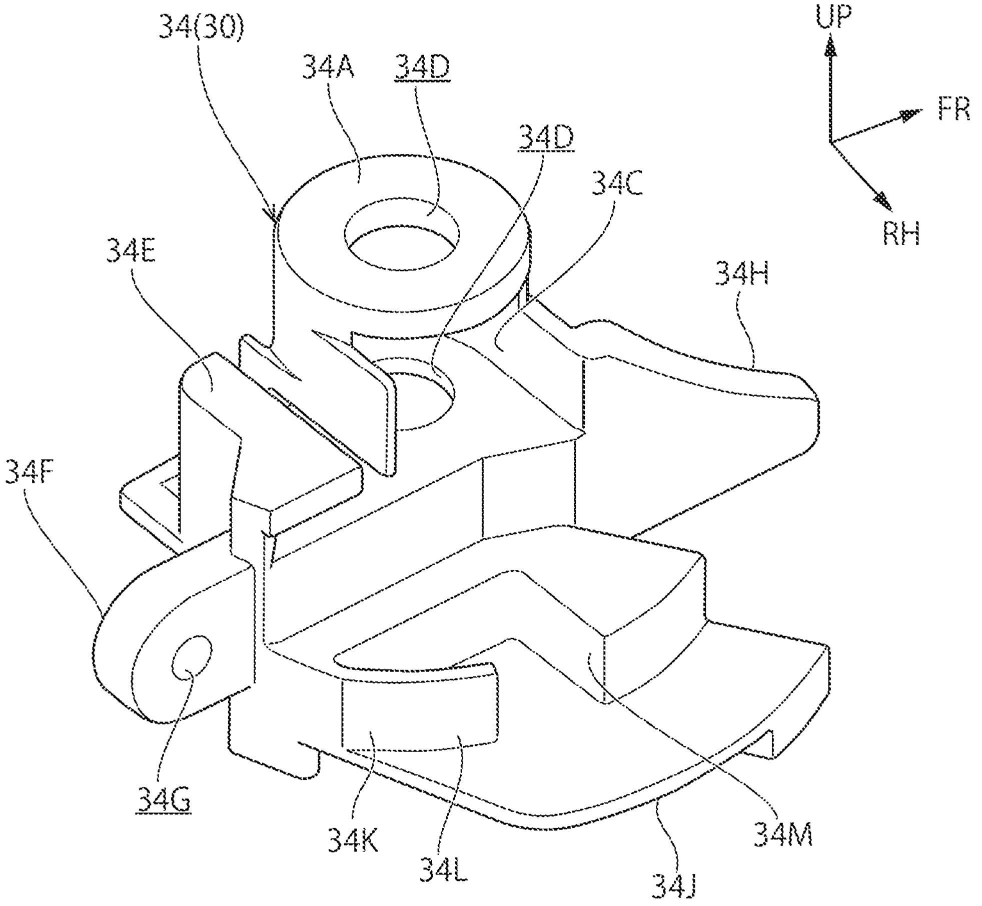
FIG. 7B is a perspective view of the sub-handle shown in FIG. 4 as viewed from the right side.
Figure 9A:
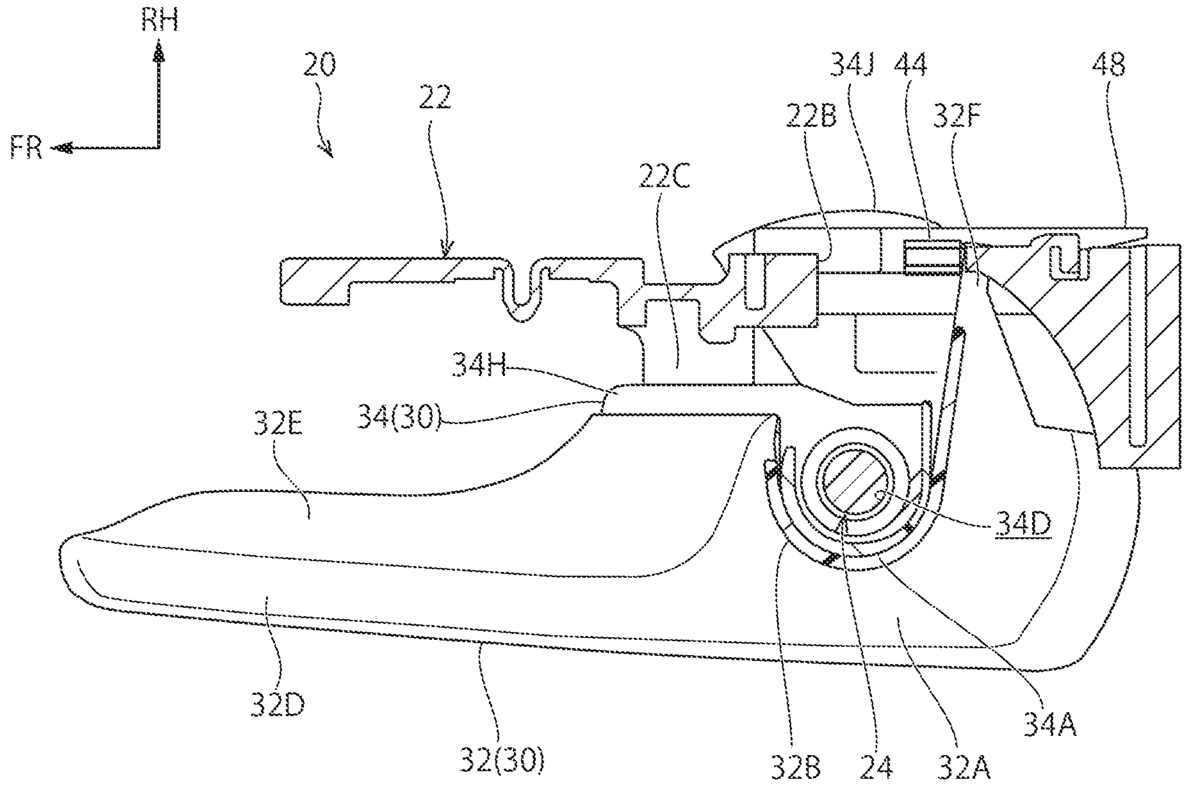
FIG. 9A is a cross-sectional view corresponding to FIG. 6A when the handle main body of FIG. 6A is pushed to the push operation position.

As shown in FIGS. 6A and 6B, the handle 30 (handle main body 32 and sub-handle 34) is arranged in a neutral position in the non-operating state of the door opening/closing detection apparatus 20. In this state, when a passenger grips the gripping portion 32D of the handle main body 32 and pushes the gripping portion 32D toward the outside of the vehicle, the handle main body 32 rotates around the axis of the support shaft 24 from the neutral position to the push operation position side (the arrow A direction side in FIG. 6A, the other side of the rotation direction) against the urging force of the first urging spring 40. On the other hand, in the sub-handle 34, the sub-side contacting portion 34H of the sub-handle 34 contacts the base stopper portion 22C of the base 22 to restrict the rotation of the sub-handle 34 toward the push operation position. Therefore, as shown in FIG. 9A, when the handle main body 32 is pushed, only the handle main body 32 rotates from the neutral position to the push operation position and the sub-handle 34 remains held in the neutral position. In other words, the main body side contacting portion 32G of the handle main body 32 is separated from the sub-stopper portion 34F of the sub-handle 34 to the left side.

When the handle main body 32 reaches the push operation position, the switch operation portion 32F of the handle main body 32 presses the lever of the first switch 44 to activate the first switch 44. This causes the first switch 44 to output a detection signal to the control unit 64. Note that when the handle main body 32 is rotated to the push operation position, the sub-handle 34 is maintained in the neutral position as described above, so the second switch 46 is not activated.

When the operation of the handle main body 32 is released in the push operation position, the handle main body 32 is rotated from the push operation position to the neutral position by the urging force of the first urging spring 40. The main body side contacting portion 32G of the handle main body 32 contacts the sub-stopper portion 34F of the sub-handle 34, and the handle main body 32 returns to the neutral position.

Figure 9B:
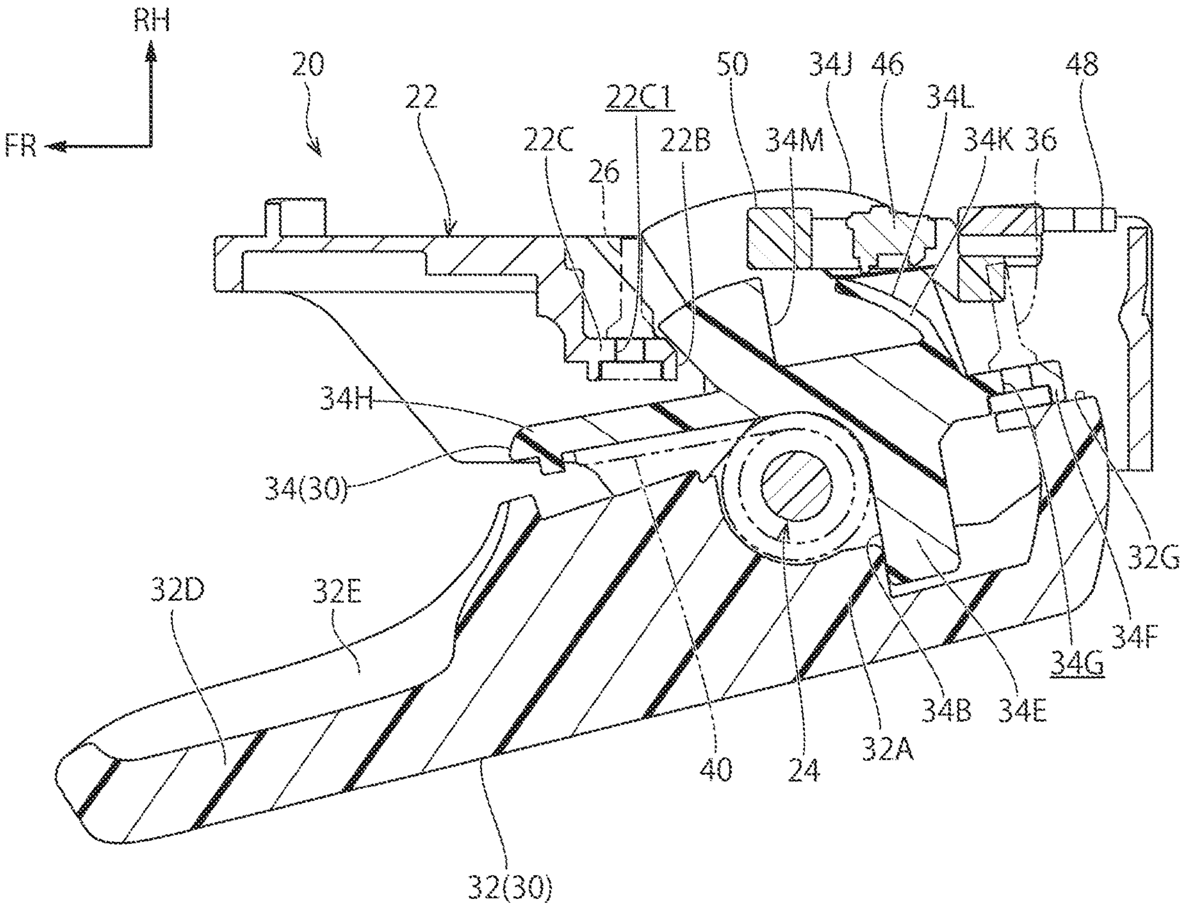
FIG. 9B is a cross-sectional view corresponding to FIG. 6B when the handle main body of FIG. 6B is pulled to the pulling operation position.

On the other hand, when a passenger grips the gripping portion 32D of the handle main body 32 and pulls the gripping portion 32D toward the interior of the vehicle, the handle main body 32 rotates around the axis of the support shaft 24 from the neutral position to the pull operation position (in the direction of arrow B in FIG. 6B, and in one side of the rotation direction). At this time, the main body side contacting portion 32G of the handle main body 32 contacts the sub-stopper portion 34F of the sub-handle 34, so the main body side contacting portion 32G presses the sub-stopper portion 34F to the right side. Thus, as shown in FIG. 9B, the handle main body 32 and sub-handle 34 rotate from the neutral position to the pull operation position against the urging force of the second urging spring 42, and the sub-side contacting portion 34H of the sub-handle 34 is separated from the base stopper portion 22C of the base 22 to the left. In other words, the sub-handle 34 rotates from the neutral position to the pull operation position in conjunction with the rotation of the handle main body 32 toward the pull operation position.

When the handle main body 32 and sub-handle 34 reach the pull operation position, the cam surface 34L of the cam portion 34K in sub-handle 34 presses the lever of the second switch 46 to activate the second switch 46. This causes the second switch 46 to output a detection signal to the control unit 64. When the handle main body 32 is rotated to the pull operation position, the switch operation portion 32F of the handle main body 32 is rotated toward the front side (direction away from the first switch 44), so the first switch 44 is not activated.

When the operation of the handle main body 32 is released in the pull operation position, the handle main body 32 and sub-handle 34 are rotated from the pull operation position to the neutral position by the urging force of the second urging spring 42. The sub-side contacting portion 34H of the sub-handle 34 contacts the base stopper portion 22C of the base 22, and the handle main body 32 and sub-handle 34 return to the neutral position.

(Operation of the Door Opening/Closing Apparatus 10 When the Handle 30 is Pulled While the Door D is Positioned in the Fully Closed Position)

When the door D is positioned in the fully closed position with the door opening of the vehicle V closed, the control unit 64 detects that the door D is fully closed based on the output signal of the door opening/closing position detection apparatus 62. In this state, when the passenger pulls the gripping portion 32D of the handle main body 32 in the door opening/closing detection apparatus 20 and the handle main body 32 and sub-handle 34 are rotated to the pull operation position, the control unit 64 detects the rotation of the handle 30 to the pull operation position based on the detection signal from the second switch 46.

When the control unit 64 detects the rotation of the handle 30 to the pull operation position, the control unit 64 drives the door opening/closing drive unit 60 to rotate the door D from the fully closed position to the open direction. This causes the door D to rotate from the fully closed position to the fully open position side, opening the door opening of the vehicle V.

(Operation of the Door Opening/Closing Apparatus 10 When the Handle 30 is Pushed While the Door D is Positioned in the Fully Closed Position)

With the door D positioned in the fully closed position, the control unit 64 detects that the door D is fully closed based on the output signal of the door opening/closing position detection apparatus 62, similar to the description above. In this state, when the passenger pushes the gripping portion 32D of the handle main body 32 in the door opening/closing detection apparatus 20 and the handle main body 32 is rotated to the push operation position, the control unit 64 detects the rotation of the handle 30 to the push operation position based on the detection signal from the first switch 44.

When the control unit 64 detects the rotation of the handle 30 to the push operation position, the control unit 64 inhibits the drive of the door opening/closing drive unit 60. In other words, the control unit 64 does not drive the door opening/closing drive unit 60. This prevents the door D from rotating from the fully closed position to the open direction, thus keeping the door D fully closed.

(Operation of the Door Opening/Closing Apparatus 10 When the Handle 30 is Pulled While the Door D is Positioned in the Fully Open or Open Position)

When the door D is rotated from the fully closed position to the fully open position side, the control unit 64 detects that the door D is in the fully open or open position based on the output signal of the door opening/closing position detection apparatus 62. Here, the open position of the door D means the position between the fully closed and fully open positions of the door D. In this state, when the passenger pulls the gripping portion 32D of the handle main body 32 in the door opening/closing detection apparatus 20, and the handle main body 32 and sub-handle 34 are rotated to the pull operation position, the control unit 64 detects the rotation of the handle 30 to the pull operation position based on the detection signal from the second switch 46.

When the control unit 64 detects the rotation of the handle 30 to the pull operation position, the control unit 64 drives the door opening/closing drive unit 60 to rotate the door D from the fully open or open position to the closed position. This causes the door D to rotate from the fully open or open position to the fully closed position, closing the door opening of the vehicle V.

(Operation of the Door Opening/Closing Apparatus 10 When the Handle 30 is Pushed While the Door D is Positioned in the Open Position)

With the door D positioned in the open position, the control unit 64 detects that the door D is in the open position based on the output signal of the door opening/closing position detection apparatus 62. In this state, when the passenger pushes the gripping portion 32D of the handle main body 32 of the door opening/closing detection apparatus 20 and the handle main body 32 is rotated to the push operation position, the control unit 64 detects the rotation of the handle 30 to the push operation position based on the detection signal from the first switch 44.

When the control unit 64 detects the rotation of the handle 30 to the push operation position, the control unit 64 drives the door opening/closing drive unit 60 to rotate the door D from the open position to the open direction. This causes the door D to rotate to the fully open position, increasing the opening angle of the door D.

As explained above, in the door opening/closing detection apparatus 20 of the present embodiment, the handle 30 is axially supported in a rotatable way on the base 22 with the vertical direction as the axis direction. The front end portion of the handle 30 is configured as a gripping portion 32D, and the gripping portion 32D is exposed operatable from the door D toward the interior of the vehicle. When the gripping portion 32D of the handle 30 is rotated from the neutral position to the push operation position, which is rotated toward the outside of the vehicle (toward the opening direction of the door D), the first switch 44 is activated by the switch operation portion 32F of the handle 30. On the other hand, when the gripping portion 32D of the handle 30 is rotated from the neutral position to the pull operation position, which is rotated toward the interior of the vehicle (toward the closing direction of door D), the cam surface 34L (cam portion 34K) of the handle activates the second switch 46. This allows detection of operations on the handle 30 while keeping the direction of push and pull operations on the gripping portion 32D of the handle 30 in line with the opening/closing direction of the door D. In particular, when the handle 30 is pulled from the neutral position, the operation is consistent with the operation of a manual inner handle on the side door of a conventional vehicle (automobile). This allows the passenger to intuitively recognize the operation to the handle 30 when opening and closing the door D. Thus, the operability of the handle 30 for the passenger can be improved.

In the door opening/closing detection apparatus 20, the handle 30 comprises a handle main body 32 with a gripping portion 32D and a sub-handle 34. When the handle main body 32 is rotated from the neutral position to the pull operation position (one side in the direction of rotation), the sub-handle 34 is rotated in conjunction with the handle main body 32. Furthermore, when the handle main body 32 is rotated from the neutral position to the push operation position (other side of the direction of rotation), the sub-handle 34 is made uninterlocked with the rotation of the handle main body 32 and is held in the neutral position. This allows the second switch 46 to be actuated by the cam portion 34K of the sub-handle 34 when the handle main body 32 is pulled, and the first switch 44 to be actuated by the switch operation portion 32F of the handle main body 32 when the handle main body 32 is pushed.

In the door opening/closing detection apparatus 20, the first urging spring 40 urges the handle main body 32 toward the pull operation position side (one side in the direction of rotation) with respect to the sub-handle 34, and the second urging spring 42 urges the sub-handle 34 toward the push operation position (other side in the direction of rotation) with respect to the base 22. Furthermore, in the neutral position of the handle 30, the sub-side contacting portion 34H of the sub-handle 34 contacts the base stopper portion 22C of the base 22 to restrict the rotation of the sub-handle 34 toward the push operation position (other side of the rotation direction). In the neutral position of the handle 30, the main body side contacting portion 32G of the handle main body 32 contacts the sub-stopper portion 34F of the sub-handle 34 to restrict the rotation of the handle main body

32 toward the pull operation position (one side of the rotation direction). This allows the sub-handle 34 to rotate in conjunction with the handle main body 32 when the handle main body 32 is rotated from the neutral position to the pull operation position side. When the handle main body 32 is rotated from the neutral position to the push operation position side, the sub-handle 34 can be held in the neutral position, uninterlocked with the rotation of the handle main body 32.

In the door opening/closing apparatus 10, if the handle 30 is rotated to the pull operation position while the door D is positioned in the fully closed position, the control unit 64 drives the door opening/closing drive unit 60 to rotate the door D in the open direction. This allows the operation of the handle 30 when opening the door D to match the operation of the manual inner handle on the side door of a conventional vehicle (automobile). This further improves the operability for the passenger.

In the door opening/closing apparatus 10, if the handle 30 is rotated to the push operation position while the door D is positioned in the fully closed position, the control unit 64 inhibits the drive of the door opening/closing drive unit 60. Thus, for example, even if a passenger inadvertently pushes the grip 32D of the handle 30 when the door D is fully closed, the door D can be prohibited from being opened. Thus, safety for passengers can be improved.

In the door opening/closing apparatus 10, when the handle 30 is rotated to the pull operation position while the door D is positioned in the fully open or open position, the control unit 64 drives the door opening/closing drive unit 60 to rotate the door D in the closing direction. This allows the direction of closing the door D and the direction of operating the handle 30 to be aligned when closing the door D with the door D positioned in the fully open or open position. Therefore, operability for the passenger can be effectively improved.

In the door opening/closing apparatus 10, when the handle 30 is rotated to the push operation position while the door D is positioned in the open position, the control unit 64 drives the door opening/closing drive unit 60 to rotate the door D in the open direction. This allows the direction of opening the door D and the direction of operating the handle 30 to be aligned when the door D is further opened with the door D positioned in the open position. Therefore, the operability for the passenger can be effectively improved in the same way as described above.

In the door opening/closing detection apparatus 20 of the present embodiment, the handle mounting portion 32A of the handle main body 32 is supported by the support shaft 24, and the gripping portion 32D of the handle main body 32 extends forward from the handle mounting portion 32A. Alternatively, in the door opening/closing detection apparatus 20, the gripping portion 32D of the handle main body 32 may be configured front and back reversed. Alternatively, it may be configured with the gripping portion 32D of the handle main body 32 reversed front and back, and arranged by rotating it 180° on a plane in the vertical and front-back directions.

In this case, it is configured that the sub-handle 34 is rotated in conjunction with the handle main body 32 when the grip 32D of the handle main body 32 is rotated from the neutral position to the push operation position. It is also configured that when the gripping portion 32D of the handle main body 32 is rotated from the neutral position to the pull operation position, the sub-handle 34 is held in the neutral position, uninterlocked with the rotation of the handle main body 32. In other words, the direction of rotation of the handle main body 32 from the neutral position to the push operation position is one side of the direction of rotation of the invention, and the direction of rotation of the handle main body 32 from the neutral position to the pull operation position is the other side of the direction of rotation of the invention.

In this case, the first switch 44 and second switch 46 are configured to interchange positions. In other words, it is configured that the first switch 44 is actuated by the cam portion 34K of the sub-handle 34 when the handle main body 32 is rotated from the neutral position to the push operation position, and the second switch 46 is actuated by the switch operation portion 32F of the handle main body 32 when the handle main body 32 is rotated from the neutral position to the pull operation position.

In the door opening/closing detection apparatus 20 of the present embodiment, the first switch 44 detects the push operation position of handle 30 and the second switch 46 detects the pull operation position of handle 30, but detection of the operating position of handle 30 is not limited to this. Hereinafter, a modification of the door opening/closing detection apparatus 20 will be described.

(Modification 1 of Door Opening/Closing Detection Apparatus)

Figure 10A:
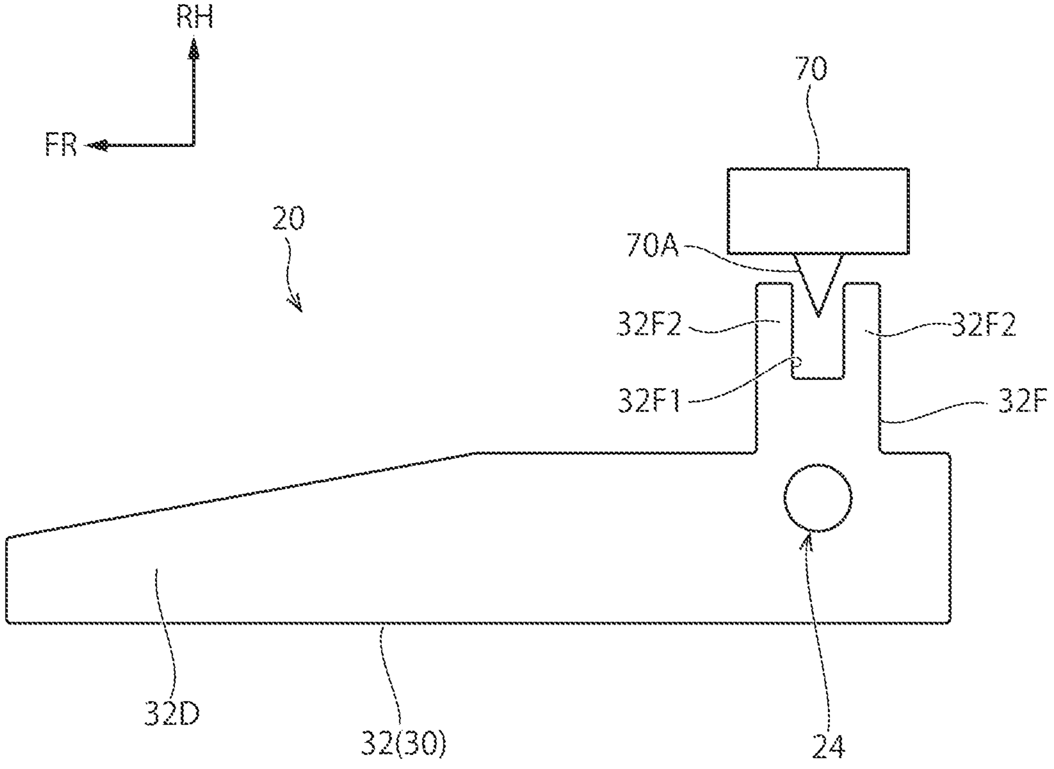
FIG. 10A is a plan view seen from above schematically showing a modification of the door opening/closing detection apparatus shown in FIG. 2.

As shown in FIG. 10A, in modification 1, the sub-handle 34 and the second urging spring 42 are omitted in the handle 30, and the handle 30 consists only of the handle main body 32. In the handle main body 32, the switch operation portion 32F protrudes to the right from the handle main body 32 on the right side of the support shaft 24. A groove 32F1 open to the right side is formed at the tip of the switch operation potion 32F. As a result, a pair of front and rear operation pieces 32F2 are formed at the tip of the switch operation portion 32F, and the pair of operation pieces 32F2 are positioned facing each other in the front-back direction via the groove 32F1.

In modification 1, a neutral spring (not shown) composed of a torsion spring or the like is provided in place of the first urging spring 40, and the neutral spring holds the handle main body 32 in the neutral position. When the handle main body 32 is rotated to the push or pull operation position, the handle main body 32 is returned to the neutral position by the urging force of the neutral spring.

In modification 1, switch 70 is provided as a "detection unit" instead of the first switch 44 and the second switch 46. Switch 70 is secured on base 22 (not shown in FIG. 10A) via a switch holder or the like, which is not shown in the figure, and is electrically connected to the control unit 64. The switch 70 is configured as a detector switch having a lever 70A configured to be actuated in two directions. Specifically, the lever 70A is positioned between a pair of operation pieces 32F2 of the switch operation portion 32F.

When the gripping portion 32D of the handle main body 32 is rotated from the neutral position to the push operation position, the lever 70A is pressed by the operation piece 32F2 on the front side of the switch operation portion 32F to activate the switch 70. On the other hand, when the gripping portion 32D of the handle main body 32 is rotated from the neutral position to the pull operation position, the lever 70A is pressed by the operation piece 32F2 on the rear side of the switch operation portion 32F to activate the switch 70. Thereby, also in the modification 1, it is possible to detect the operation of the handle 30 while matching the directions of the pushing operation and the pulling operation against the gripping portion 32D of the handle 30 (handle main body 32) with the opening/closing direction of the door D. Therefore, also in the modification 1, the operability of the handle 30 for the passenger can be improved.

(Modification 2 of Door Opening/Closing Detection Apparatus)

Figure 10B:
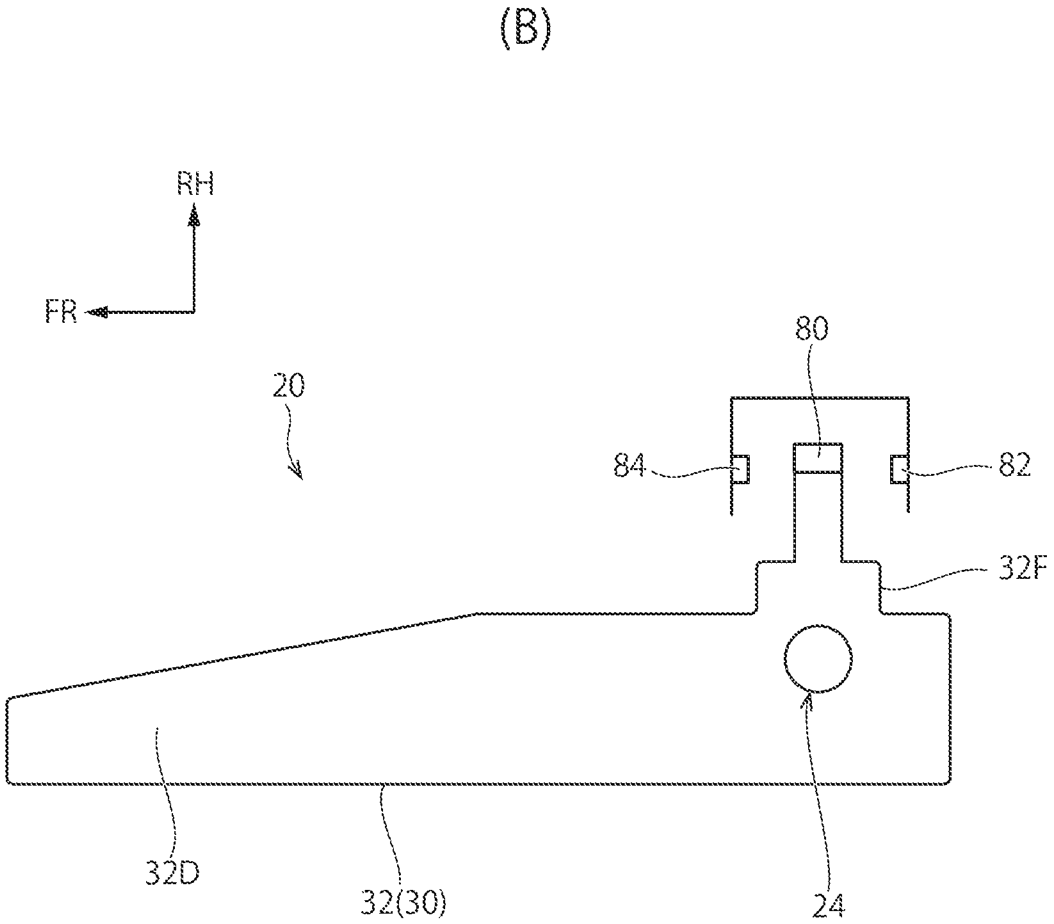
FIG. 10B is a plan view seen from above schematically showing another modification of the door opening/closing detection apparatus.

As shown in FIG. 10B, in the modification 2, as in the modification 1, the sub-handle 34 and the second urging spring 42 are omitted in the handle 30, and the handle 30 consists only of the handle main body 32. In the handle main body 32, the switch operation portion 32F protrudes to the right from the handle main body 32 on the right side of the support shaft 24. The tip of the switch operation portion 32F has a magnet 80. In the modification 2, as in the modification 1, a neutral spring is provided in the handle main body 32, and the handle main body 32 is held in the neutral position.

In the modification 2, a pair of magnetic sensors 82 and 84 are provided as "detection units" instead of the first and second switches 44 and 46. The magnetic sensors 82 and 84 are configured as Hall elements and are fixed to the base 22 (not shown in FIG. 10B) via a sensor substrate, which is not shown, and are electrically connected to the control unit 64. Magnetic sensor 82 is located behind magnet 80, and magnetic sensor 84 is located in front of magnet 80. The magnetic sensors 82 and 84 output detection signals to the control unit 64 in accordance with the magnetic flux density of the magnet 80, so that the position of the handle 30 is detected by the control unit 64.

When the gripping portion 32D of the handle main body 32 is rotated from the neutral position to the push operation position, the magnet 80 approaches the magnetic sensor 82, and the push operation position of the handle main body 32 is detected by the magnetic sensor 82. On the other hand, when the gripping portion 32D of the handle main body 32 is rotated from the neutral position to the pull operation position, the magnet 80 approaches the magnetic sensor 84, and the pull operation position of the handle main body 32 is detected by the magnetic sensor 84. Thereby, also in the modification 2, it is possible to detect the operation of the handle 30 while matching the directions of the pushing operation and the pulling operation against the gripping portion 32D of the handle 30 (handle main body 32) with the opening/closing direction of the door D. Therefore, also in modification 2, the operability of the handle 30 for the passenger can be improved.

EXPLANATION OF THE REFERENCE NUMERALS

10 Door opening/closing apparatus
20 Door opening/closing detection apparatus
22 Base
30 Handle
32 Handle main body
32D Gripping portion
32F Switch operation portion (main body side operation portion)
34 Sub-Handle
34K Cam portion (sub-side operation portion)
40 First urging spring (first urging member)
42 Second urging spring (Second urging member)
44 First switch (detection unit) (switch)
46 Second switch (detection unit) (switch)
60 Door opening/closing drive unit
62 Door opening/closing position detecting apparatus (door
opening/closing position detection unit)
64 Control unit
70 Switch (detection unit)
80 Magnet
82 Magnetic sensor (detection unit)
84 Magnetic sensor (detection unit)
D Door
V Vehicle

What is claimed is:

1. A door opening/closing detection apparatus comprising:

a base mounted on a vehicle door;

a handle with one end portion axially supported in a rotatable way on the base with the vertical direction as an axis direction, with other end portion having a gripping portion exposed to be operatable from the door to an interior side of the vehicle, and when operated, rotates the gripping portion from a neutral position to a pull operation position in which the door is rotated in a closing direction or from the neutral position to a push operation position in which the door is rotated in an opening direction;

a detection unit for detecting the push operation position and pull operation position of the handle, wherein the detection unit is actuated by the handle in the push operation position and pull operation position;

wherein the detection unit has a pair of switches, and wherein the handle comprises:

a handle main body with one end portion axially supported in a rotatable way by the base, and has the gripping portion at the other end; and a sub-handle that is axially supported in a rotatable way on the base coaxially with the handle main body, rotates in conjunction with the handle main body when the handle main body rotates from the neutral position to one side in the direction of rotation, and is held in the neutral position when the handle main body rotates from the neutral position to the other side in the direction of rotation, being uninterlocked from the rotation of the handle main body, wherein the handle main body has a main body side operation portion that activates one of the pair of switches when rotating from the neutral position to the other side in the direction of rotation; and the sub-handle has a sub-side operation portion that activates the other of the pair of switches when the handle main body is rotated from the neutral position to one side in the direction of rotation.

2. The door opening/closing detection apparatus according to claim 1, comprising:

a first urging member that urges the handle main body against the sub-handle in one side in the direction of rotation; and a second urging member that urges the sub-handle against the base toward the other side in the direction of rotation, wherein, in the neutral position, the sub-handle contacts the base to restrict rotation of the sub-handle to the other side in the direction of rotation, and the handle min body contacts the sub-handle to restrict rotation of the handle main body to one side in the direction of rotation.

3. The door opening/closing apparatus according to claim 1, wherein the control unit inhibits the drive of the door opening/closing drive unit when the handle is rotated to the push operation position while the door is positioned in the fully closed position.

4. A door opening/closing apparatus according to claim 1, wherein the control unit drives the door opening/closing drive unit to rotate the door in the closing direction when the handle is rotated to the pull operation position while the door is positioned in the fully open or open position.

5. The door opening/closing apparatus according to claim 4, wherein the control unit drives the door opening/closing drive unit to rotate the door in the open direction when the handle is rotated to the push operation position while the door is positioned in the open position.

6. The door opening/closing apparatus according to claim 1, wherein the detection unit is a switch actuated by the handle in the push operation position and pull operation position.

7. The door opening/closing apparatus according to claim 6, wherein:

the detection unit has a pair of switches, and the handle comprises:

a handle main body with one end portion axially supported in a rotatable way by the base, and has the gripping portion at the other end; and a sub-handle that is axially supported in a rotatable way on the base coaxially with the handle main body, rotates in conjunction with the handle main body when the handle main body rotates from the neutral position to one side in the direction of rotation, and is held in the neutral position when the handle main body rotates from the neutral position to the other side in the direction of rotation, being uninterlocked from the rotation of the handle main body, wherein, the handle main body has a main body side operation portion that activates one of the pair of switches when rotating from the neutral position to the other side in the direction of rotation; and the sub-handle has a sub-side operation portion that activates the other of the pair of switches when the handle main body is rotated from the neutral position to one side in the direction of rotation.

8. The door opening/closing apparatus according to claim 7, comprising:

a first urging member that urges the handle main body against the sub-handle in one side in the direction of rotation; and a second urging member that urges the sub-handle against the base toward the other side in the direction of rotation, wherein, in the neutral position, the sub-handle contacts the base to restrict rotation of the sub-handle to the other side in the direction of rotation, and the handle min body contacts the sub-handle to restrict rotation of the handle main body to one side in the direction of rotation.

9. The door opening/closing apparatus according to claim 1, wherein, the handle is provided with a magnet, and the detection unit has a pair of magnetic sensors; and the pull operation position of the handle is detected by detecting the proximity of the magnet by one of the magnetic sensors when the handle is rotated, and the push operation position of the handle is detected by detecting the proximity of the magnet by the other magnetic sensor when the handle is rotated.

* * * * *